United States Patent [19]

Rasmussen

[11] Patent Number: 4,922,725

[45] Date of Patent: May 8, 1990

[54] REFRIGERATED MIXING AND DISPENSING MACHINE FOR PREPARATION OF FROZEN DAIRY PRODUCTS

[76] Inventor: Aaron P. Rasmussen, 9609 Candy La., La Mesa, Calif. 92041

[21] Appl. No.: 295,228

[22] Filed: Jan. 9, 1989

[51] Int. Cl.⁵ .............................................. A23G 9/20
[52] U.S. Cl. ...................................... 62/136; 62/306; 62/342; 222/146.6; 366/312; 464/36; 418/248
[58] Field of Search .................... 62/342, 136, 306; 464/36; 418/248; 366/311–313; 222/146.6

[56] References Cited

U.S. PATENT DOCUMENTS

| | | | |
|---|---|---|---|
| 1,993,130 | 3/1935 | Ballew | 62/342 X |
| 2,559,032 | 7/1951 | Tacchella | 62/342 X |
| 3,018,641 | 1/1962 | Carpigiani | 62/342 |
| 3,139,036 | 6/1964 | McGill | 418/248 X |
| 3,188,826 | 6/1965 | Carpigiani | 62/342 X |
| 3,252,304 | 5/1966 | Moody | 464/36 |
| 3,272,132 | 9/1966 | Stoelting et al. | 62/342 X |
| 3,317,198 | 5/1967 | Phelan et al. | 62/342 X |
| 3,464,220 | 9/1969 | Phelan | 62/342 |
| 4,073,339 | 2/1978 | D'Orsay | 366/312 X |
| 4,412,428 | 11/1983 | Giannella et al. | 62/342 X |
| 4,580,905 | 4/1986 | Schwitters et al. | 62/342 X |

*Primary Examiner*—William E. Tapolcai
*Attorney, Agent, or Firm*—Charles C. Logan, II

[57] ABSTRACT

A refrigerated mixing and dispensing machine for the preparation of frozen dairy products and ice mixed beverages. The machine has a housing within which is mounted standard industrial units such as a compressor, condenser, evaporative coils and regulatory equipment. Also mounted in the housing is a gear motor having a torque adjustable clutch designed to disengage the gear motor from the drive line in the event of an overload. Its unique configuration and integral receptor features function to conserve space and shorten the drive line. A mixing pump is connected to the clutch and it is of an offset, rotary cam design, that features a uniquely shaped and positioned plunger valve designed to transmit and regulate the pressure of fluids pumped from the mix tank to the dasher cylinder. Fitted to a cavity of the pump housing and extending above fluid levels of the mix tank is a sleeve type metering valve which functions to house the pump plunger and regulate the mixture of air and fluid entering the pump. The dasher assembly features a torque activated self-sharpening, rotatable blade designed to increase scraping pressures on the interior cylinder barrel corresponding with a decrease in mix vescosity. The dispensing assembly has a design that simplifies disassembly and eliminates lost pins.

9 Claims, 6 Drawing Sheets

REFRIGERATED MIXING AND DISPENSING MACHINE FOR PREPARATION OF FROZEN DAIRY PRODUCTS

BACKGROUND OF THE INVENTION

The invention relates to a mixing and dispensing machine and more specifically a machine used for the preparation of frozen dairy products and ice mixed beverages.

In the past refrigerated mixing and dispensing machines were bulky due to the fact that the drive train for the machine was offset from the drive shaft of the motor. These drive trains usually utilized drive belts which results in power loss, slipping and inefficient use of space.

Since many prior refrigerated mixing and dispensing machines have the mix gravity fed to the dasher assembly, there is resulting erratic performance of the machines. When equipped with a pump, existing refrigerated mixing and dispensing machines are often not easy to disassemble and clean.

Another existing problem for prior refrigerated mixing and dispensing machines is the inability of the the dasher blade assembly to keep the mix from freezing on the interior walls of the freezing cylinder thereby causing inefficient heat transfer. Most of these machines have fixed blades that maintain a constant pressure and present wear problems. Other tensioning means employ complicated spring mechanisms, or fluid pressure seals.

A further problem to be improved upon is the dispensing assembly of the present day machines. Most of them have excessive play in the inner face union. Also most of the handles are made of more than one piece.

One object of the invention has been to create a gear-motor driven, over the shaft, clutch assembly, configuration option design to provide an inexpensive, short coupled torque adjustable structure for disengaging the drive linkage. The clutch has been designed to contain a receptor fitted to receive a flexible coupler. Such a device shortens the drive-line and eliminates the problems associated with offset belt drives, namely power loss, slippage and inefficient use of space.

Another object of the invention is to produce an offset mount, clutch driven, rotary pump to transport fluid/air mixtures from the mix tank to the dasher cylinder. The pump has been designed to utilize plunger gravity or a combination of gravity and spring tension to adjust bypass volume, which in turn controls delivery pressures without the use of additional valve structure in return lines. This simple two piece pump insures constant delivery and eliminates the erratic performance of gravity fed machines. It is also easier to disassemble and clean than existing gear pump assemblies.

A further object of the invention has been to construct a sleeve type metering valve designed to regulate the ratio of air to fluid at the pump intake. Fitted to the pump body, the assembly also functions to house the gravity stem of the pump plunger and the optional plunger tensioning spring. The design requirements specify a continum of air infusion settings, provisioned for adjustment of bypass pressures, and complete disassembly for convenient cleaning. This unit would replace the standard gravity fed carburetor tubes that fail to fill or properly regulate mix ratios.

An additional object of the invention has been to design a dasher assembly that will effectively fold the mix against the cylinder freezing wall, move the mix forward toward the dispensing orifice, and keep the interior walls of the freezing cylinder clean to insure efficient heat transfer. The later function has been particularly troublesome. Fixed blade machines maintain constant pressure and present wear problems. Other tensioning means employ complicated spring mechanisms. A primary design objective of the present invention was to develop a novel torque regulated tensioning structure that would sense the consistency of the mix and adjust the blade wiping pressure accordingly. In the present invention, torque from the lateral surface of the pump is utilized to pressure load the scraper blade against the cylinder wall in proportion to the torque required to rotate the dasher, a variable that is determined by the viscosity of the mix. Other maintenance objectives require the scraper blade be wear compensating and inexpensive to replace.

A final object of the invention has been to develop a dispensing assembly of a simple design that would feature a piston type of valve in ball and socket engagement with a leveraged handle. The engagement was sought to minimize play in the innerface union, but would require a reciprocating fulcrum. An object of the invention was to design a tracking structure that would support that requirement. A further object of the design was to develop a one piece handle with fixed pin fulcrum that could be front loaded to its operating position. A removable dispensing cup would be required to limit sleeve travel, and variations in cup orifice would be essential to accommodate desired changes in the volume and shape of the product.

DESCRIPTION OF THE PREFERRED EMBODIMENT

Applicant's novel refrigerated mixing and dispensing machine for the preparation of frozen dairy products and ice mixed beverages will now be described by referring to FIGS. 1–17C of the drawings. The refrigerated mixing and dispensing machine is generally designated numeral 20.

Machine 20 has a housing 22 having a top cover 23, a bottom wall 24, a front cover 25, a rear cover 26 and laterally spaced side walls 27 and 28. Inside the housing is a frame 30, and standard industrial units such as a compressor 32, condenser 33, evaporative coils 34 and other regulatory equipment (not shown).

Figure 1:
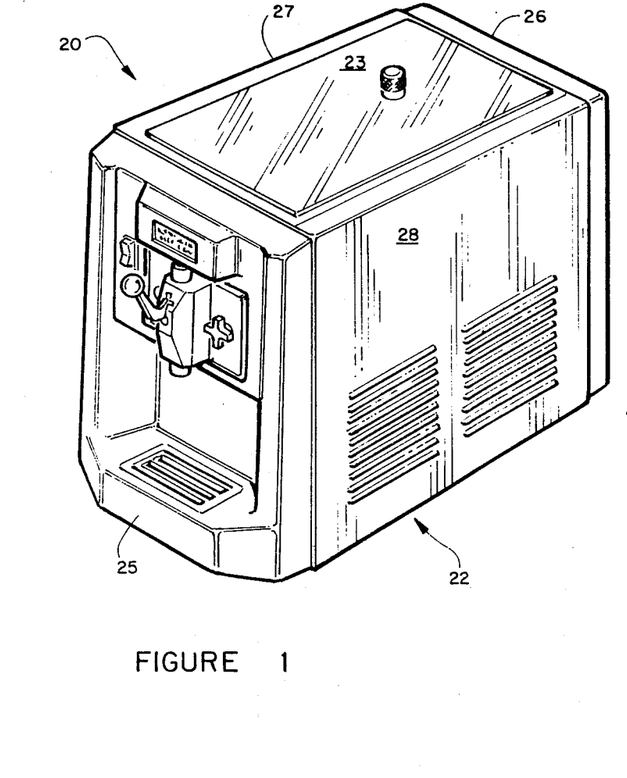
FIG. 1 is a front perspective view of applicant's novel refrigerated mixing and dispensing machine.
Figure 2:
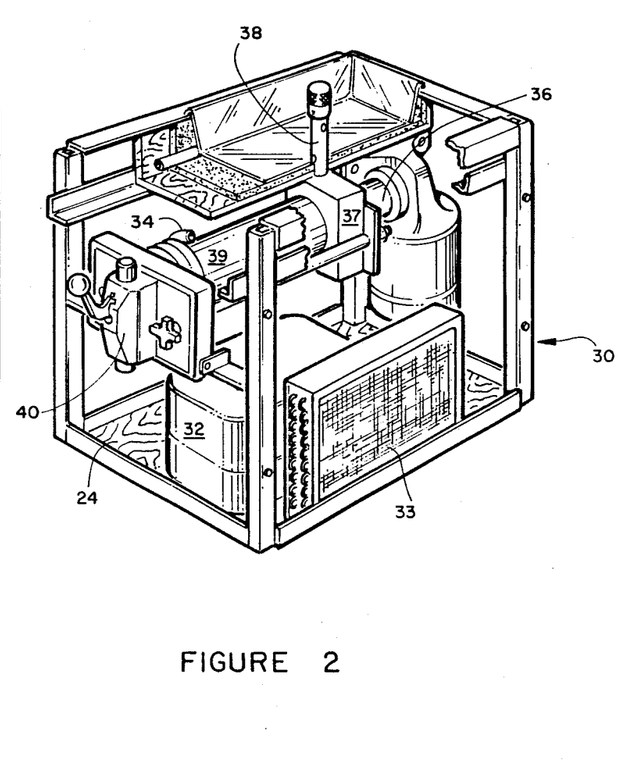
FIG. 2 is a front perspective view of the novel refrigerated mixing and dispensing machine with its housing removed.
Figure 3:
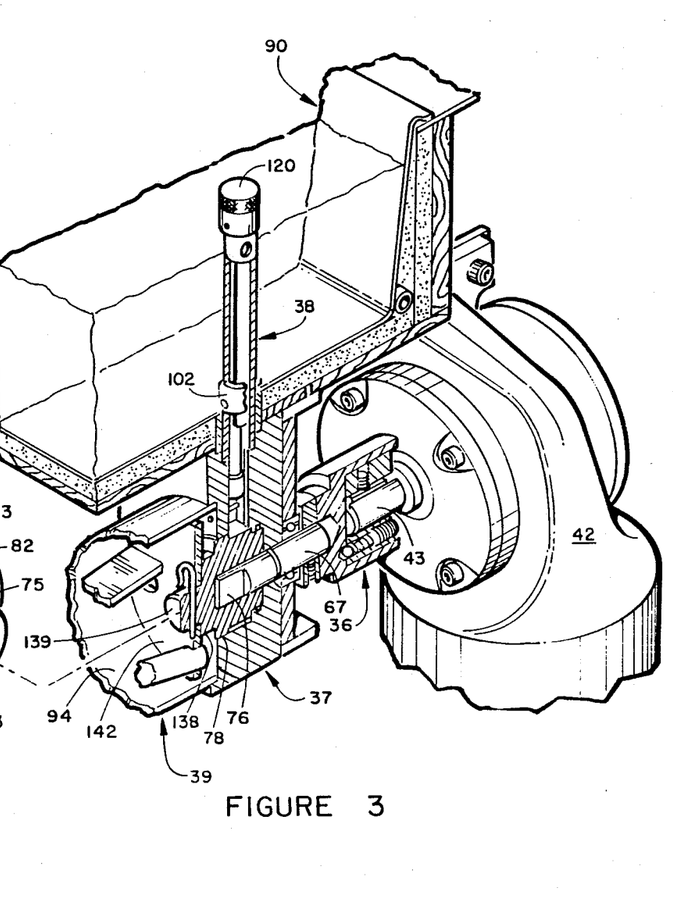
FIG. 3 is a partial perspective view with portions broken away illustrating the interrelationship between the motor, clutch, pump, mix tank, and dasher assembly.

The discussion in the remainder of the specification will relate to the novel structure of the refrigerated mixing and dispensing machine 20. FIG. 2 provides an in-frame, connective orientation to the component assemblies claimed as novel in this specification. Those components, in drive line order, are: clutch assembly 36, pump assembly 37, metering assembly 38, dasher assembly 39, and dispensing assembly 40.

Figure 5:
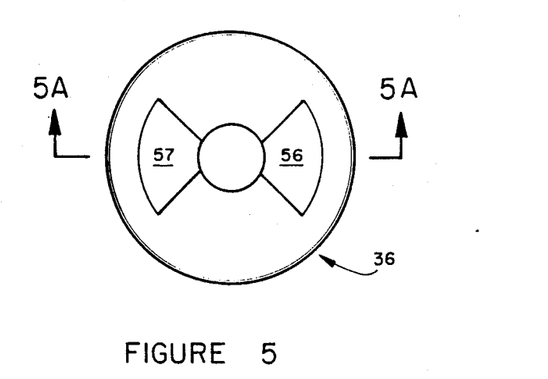
FIG. 5 is a front end elevation view of the clutch.
Figure 5A:
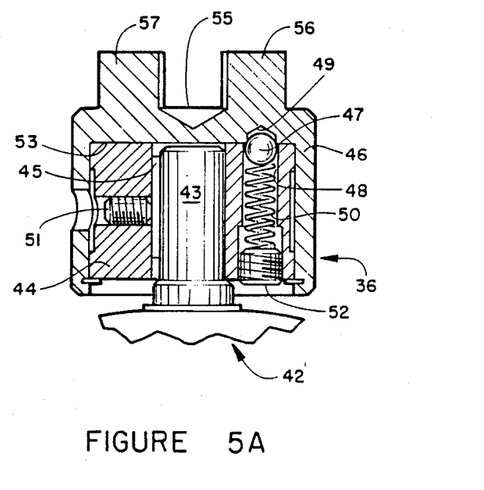
FIG. 5A is a cross sectional view taken along lines 5A—5A of FIG. 5.
Figure 5B:
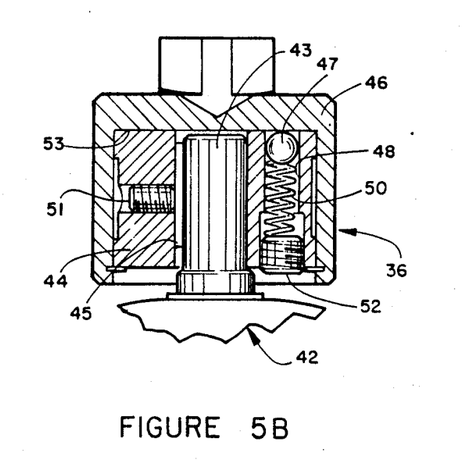
FIG. 5B is a cross sectional view similar to that of FIG. 5A but one in which the clutch is disengaged from the drive train.
Figure 6:
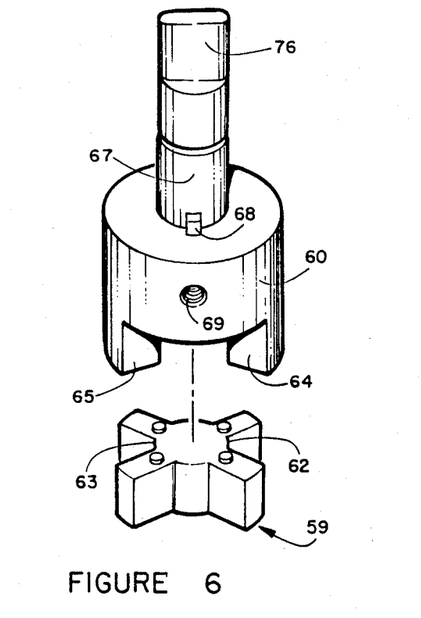
FIG. 6 is an exploded perspective view illustrating the coupler member and its spider.

Clutch 36 is powered by gearmotor 42 through drive shaft 43. In FIG. 5A, drive shaft 43 is shown to be interlocked to sleeve 44 with key 45 and set screw 46. Sleeve 44 delivers rotational thrust to clutch body 46 when ball 47 is jointly engaged in bore 48 of sleeve 44 and detent 49 of clutch body 46. Ball 47 is so engaged when compression spring 50 in bore 48 bears against set screw 52. Set screw 52 is thread adjustable in bore 48 and transmits a specified spring pressure to bear on ball 47. In FIG. 5B, the torque load has over ridden the spring tension forcing ball 47 to exit detent 49 and rotate against smooth wall 53 of housing 46. In that event, the clutch will free-wheel through 360 degrees and then attempt to re-engage at the detent point. When the overload is discontinued, the clutch will re-enter the drive mode.

Figures 7A, 7B, 10, 11, 12:
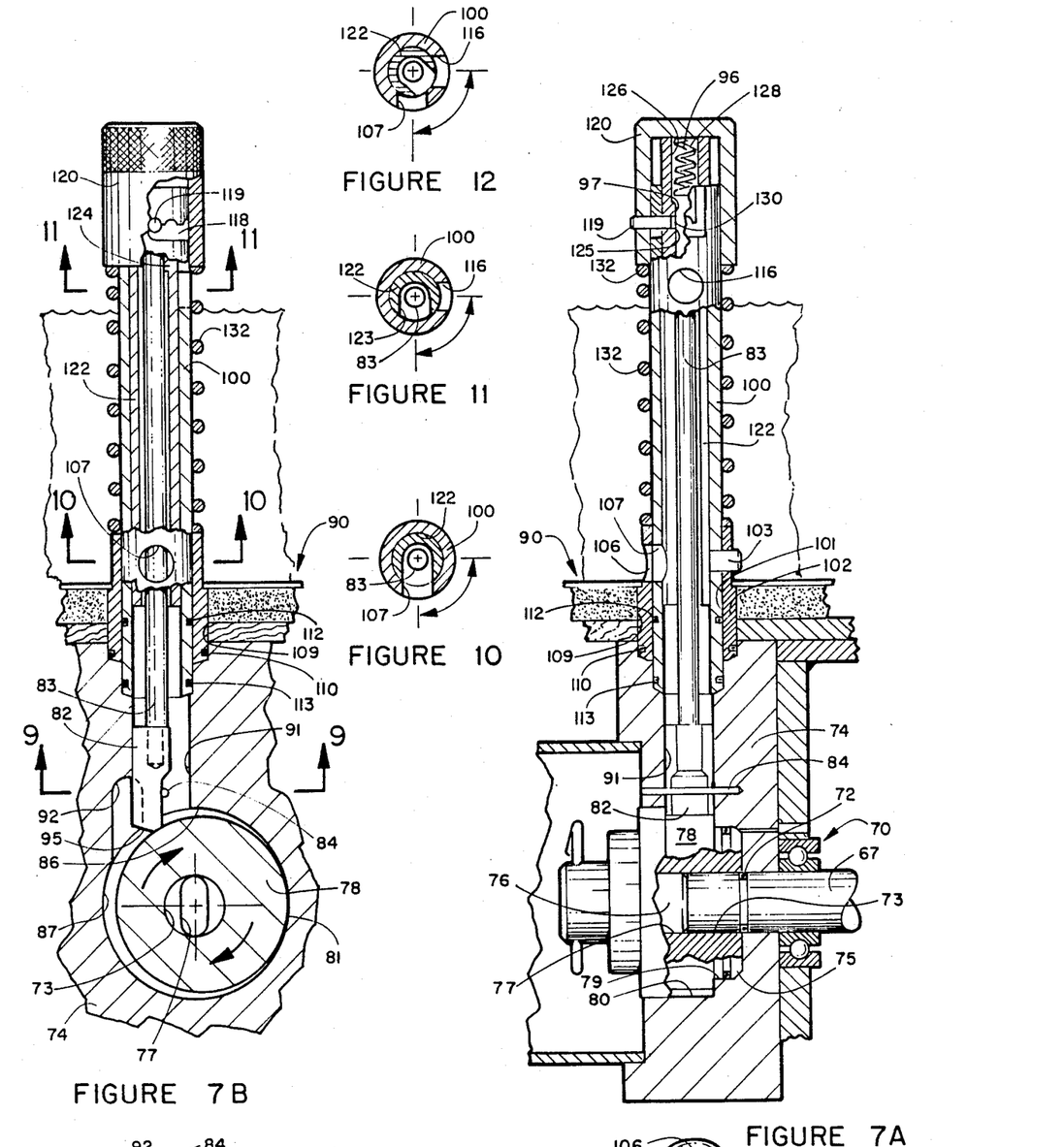
FIG. 7A is a vertical cross sectional view taken through the pump, the mixing tank, and the end of the dasher assembly.
FIG. 7B is a cross sectional elevation view taken at ninety degrees to the structure illustrated in FIG. 7A.
FIG. 10 is a cross sectional view taken along lines 10—10 of FIG. 7B.
FIG. 11 is a cross sectional view taken along lines 11—11 of FIG. 7B.
FIG. 12 is a cross sectional view demonstrating the intermediate position between that illustrated in FIGS. 10 and 11.
Figure 8:
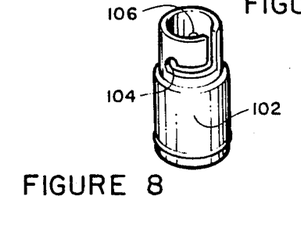
FIG. 8 is a perspective view illustrating the collar connecting the top of the pump with the bottom of the mix tray.

The lateral output face of clutch housing 46 has a relieved slot 55 that forms protruding fingers 56 and 57. Slot 55 is contoured to receive commercial flexible spider 59 and coupler body 60 (see FIG. 6). Spider 59 fits between fingers 56 and 57 protruding from clutch body 46. Flexible spider 59 has wedge-shaped recesses 62 and 63 that receive wedge-shaped fingers 64 and 65 extending from coupler body 60. Coupler body 60 is fixed to drive shaft 67 with key 68 and set screw 69. In FIG. 7A drive shaft 67 is shown to penetrate bearing 70 and O-ring 72 forms a seal between pump housing 74 and drive shaft 67. A rectangular tang end 76 is formed on the front end of drive shaft 67 and it mates with a slot 77 in drive pump rotor 78. The round portion of shaft 67 is received in bore 73 of drive pump rotor 78.

Figure 9:
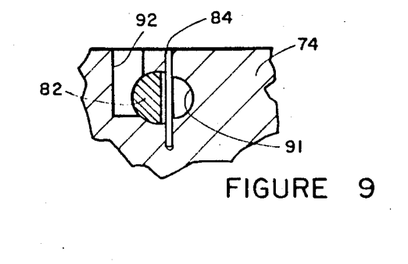
FIG. 9 is a partial cross sectional view taken along lines 9—9 of FIG. 7B.
Figure 13:
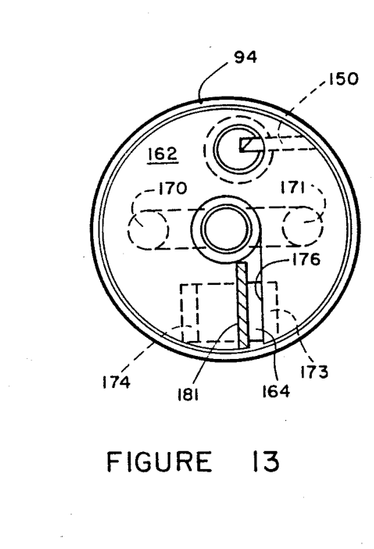
FIG. 13 is a front end elevation view of the dasher assembly.

Pump rotor 78, shown in clockwise rotation in FIG. 7B, forms a running seal with the bore 80 of pump housing 74 at the point of maximum dislocation of cam surface 81. Pump rotor has a hub 75 formed on its rear face that mates with annular recess 79 in pump housing 74. Reciprocating plunger 82 is supported by gravity stem 83 and pin 84. Pin 84 stabilizes and prevents misalignment of the plunger, so that it may be inserted in one position only. Plunger 82 functions to divide the cam cavity into two chambers, vacuum chamber 86 to the rear of the seal, and pressure chamber 87 forward of the seal. With cam rotation, the moving seal acts to vacuum draw fluids from the mix tank 90, passing plunger 82 through enlarged passage 91 as shown in FIG. 7B and FIG. 9. Simultaneously, chamber 87 is pressurized to deliver fluids from that chamber through port 92 to freezing cylinder 94 of dasher assembly 39. The offset position and unique shape of plunger 82 provides an efficient seal yet permits it to act in the manner of a piston to control pressure at the output side of the plunger. When fluid pressure bearing against pressure relief surface 95 exceeds that of stem gravity, plunger 82 is forced upward, in which case, it functions as a bypass valve to regulate cylinder pressure. Delivery pressures may be increased with the insertion of spring 96, fitted to shoulder 97 at the top of plunger stem 83 (see FIG. 7A).

As indicated in FIGS. 7A and 7B, pump housing 74 provides an insertion structure for metering tube 100. Metering tube 100 is removable for cleaning and is shown locked in bore 101 of collar 102 with clockwise rotation of pin 103 in bayonet recess 104. In that position, aperture 106 of collar 102 is aligned with tube orifice 107 to permit fluid entry. Collar 102 is bonded to mix tank 90 and fits in bore 109 and is sealed to pump housing 74 by O-ring 110. Tube 100 is sealed to collar 102 by O-ring 112 and to pump housing 74 by O-ring 113. At the base of mix pan 90, tube 100 features the fluid inlet orifice 107, and above, at a position ninety degrees removed, an air intake orifice 116. Metering tube 100 at its top is notched to form a bayonet slot 118 that has been cut to receive and position pin 119 of adjuster cap 120. Closely fitted to the interior wall of tube 100 is sleeve 122 with slots 123 (see FIG. 11). Sleeve 122 extends downwardly just below liquid intake orifice 107. The top end of sleeve 122 extends to a point 124 immediately above air intake orifice 116. Sleeve 122 also shows its bore 125 in bearing support of stem 83. Sleeve 122 has a counter bore 126 at its top end that has been enlarged to contain optional tension spring 128. To effect adjustment of the fluid-air mix, pin 119 must be fitted to hole 130 of sleeve 122. Cap 120, with pin 119 may then be fitted in bayonet slot 118 and turned to any of the several notched locations to produce rotation of sleeve slot 123. Spring 132 exerts light compression on both bayonet locks to stabilize the position of the tube 100 and sleeve 122. FIG. 12 superimposed orifice 116 and orifice 107 to illustrate the effect of the rotation on the ratio of air to fluid drawn by the pump.

Figures 14, 15, 16:
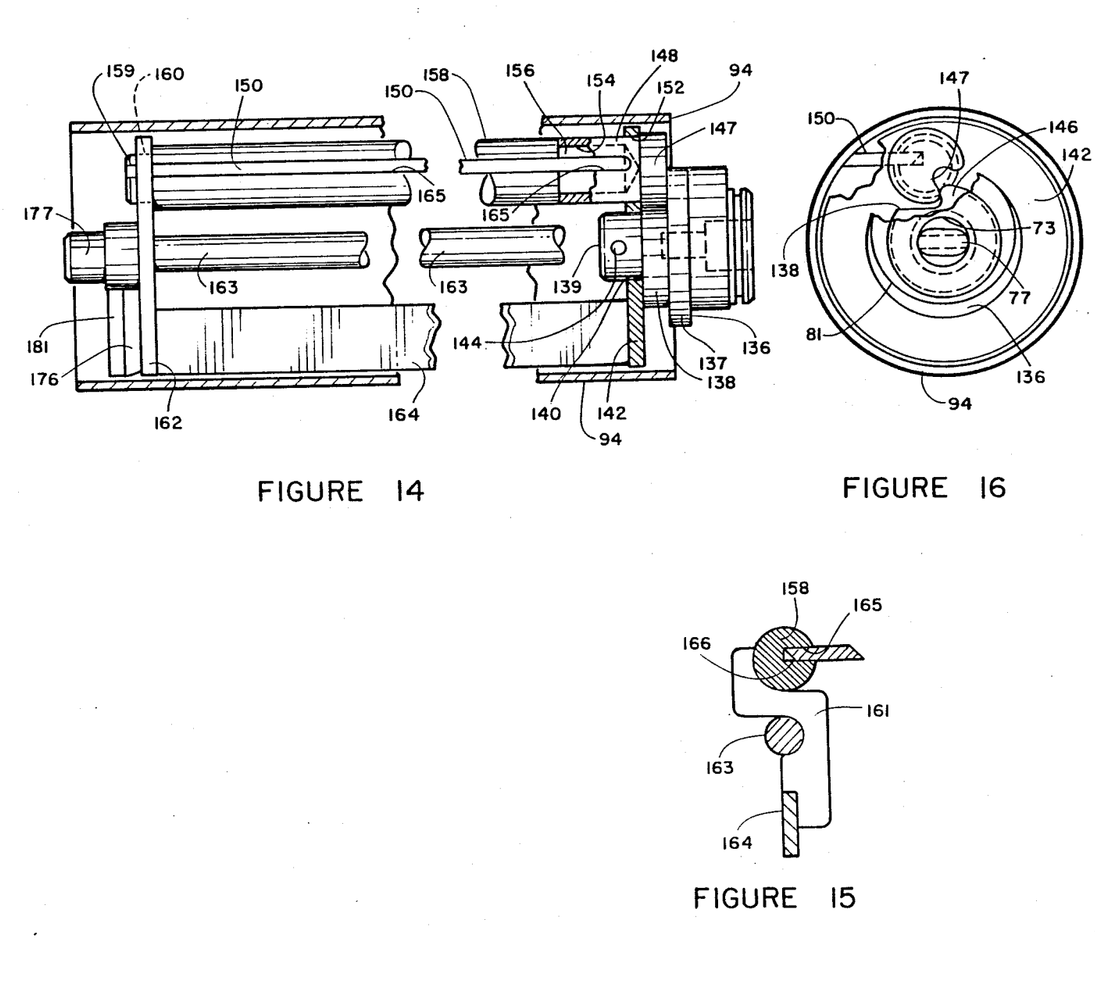
FIG. 14 is an elevational view of the dasher assembly with portions broken away for clarity.
FIG. 15 is a cross sectional view illustrating the blade and supporting structure therefore within the dasher assembly.
FIG. 16 is an elevation view of the rear end of the dasher assembly.

Pump rotor 78 also serves as a dasher support and drive module as related in FIGS. 13–16, which detail the dasher assembly 39. Shown in those Figures, is a slot 77 which accepts drive tank 76 of FIG. 6. Lateral surface 136 of rotor flanges 137, seals pump chambers 86 and 87. In FIG. 14, forward of flange 137, is shoulder 138 and axle 139 which penetrates bore 140 to support intake disc 142. As illustrated, pump axle 139 is keyed at point 144 and is removable with the dasher assembly for cleaning.

It should be noted that the dasher assembly, shown in FIGS. 13-16, is not driven directly, rather, rotation is achieved through a leveraged means best understood as an interaction of three basic components comprised of: drive pump rotor 78, blade hub 148 and scraper blade 150. Drive rotor 78, shown in FIG. 16, is free to rotate on axle 139 in bore 140 of dasher disk 142 as shown in FIG. 14. When counterclockwise torque is applied to drive rotor 78, profiled in FIG. 16, a leveraged force is transmitted by rotor drive pawl 146 to pawl 147 of blade hub 148, forcing it to reverse rotate, as would a lever, in a clockwise direction. Scraper blade 150 resides in notch 165 of hub 148 and rotates with the hub in bore 152 of disk 142, to bear, in wedge like fashion against the interior wall of freezing cylinder 94. It is important to understand that blade 150 is the extension of an applied leverage, and that stable contact of that blade with cylinder wall 94 is a requisite for dasher rotation, further, that blade pressure is functionally controlled by the amount of torque leverage required to drive the dasher through the mix. Scraping pressure then, is physically regulated by, and proportionate to mix viscosity, assuring optimal blade pressure at all times. A fluid mix will require less drive leverage easing pressure on the scraper blade, but a frozen mix will demand high drive torque with an attendant increase in blade pressure and scraping efficiency. The unique cavity like shape of pawls 146 and 147 provide rotational compensation for blade wear, yet restrict the range of rotation to prevent overcenter wedging and lockup. Hub 148 is contained in bore 152 of support intake disc 142 and held in place by flange 137. Inserted in bore 154 of hub 148 is reduced shoulder 156 of radial support rack 158. At its opposite end, rack shoulder 159 resides in bore 160 of dasher discharge disc member 162. At its center, rack 158 is contour supported by frame member 161 which is fixed to beater bar 163 and feed bar 164. Notch 165 in hub 148 positions scraper blade 150 which is simply made, reversible and easily removed from rack groove 166 for cleaning.

Figure 4:
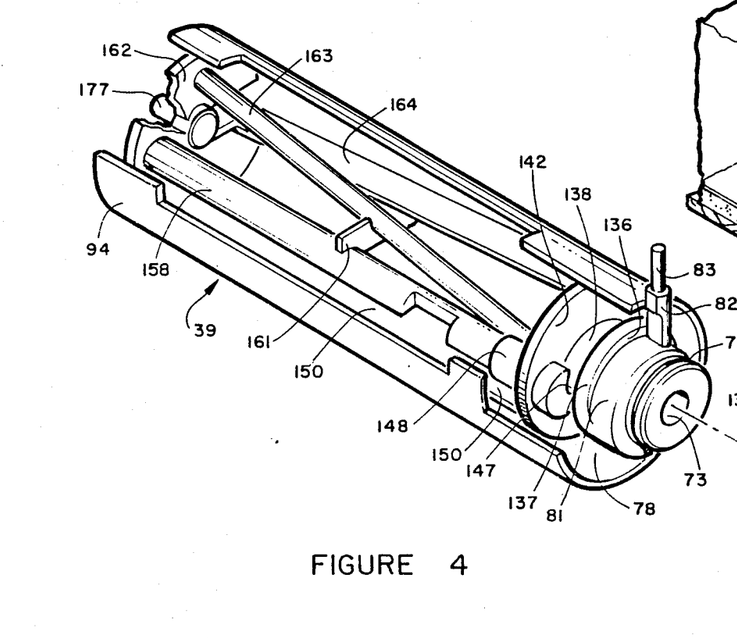
FIG. 4 is a front perspective view of the dasher assembly with portions broken away for clarity.

In FIGS. 4 and 14, beater bar 163 is attached at one end to disc 162 at point 170 and runs diagonally to point 171 of support intake disc 142. The function of this bar is to fold the mix. In similar fashion, feed bar 164 extends diagonally from point 173 of disc 162 to point 174 of support intake disc 142. Feed bar 164 serves to drive the mix toward the freezing wall and forward to exit opening 176 of disc 162. Center post 177 is fixed at the axis of disc 162 and is in running fit with bore 179, shown on face plate 180 of FIGS. 17A-C. Mix from the cylinder is forced, with the rotation of flange lip 181 (FIG. 14) to enter orifice 183 (shown in FIGS. 17A-C).

Dispensing assembly 40 is equipped with a handle assembly comprising ball handle 185, which is molded to the arm 186, shown penetrated by fulcrum pin 187, and at its terminal end, with drive ball 188. The ball 188 is in ball and socket engagement with ball spherical socket 189. Spherical socket 189 has a lineal slot 190 at its face to permit arm 186 to penetrate piston 192 at the extremes of its thrust. Providing an entry pathway for the handle assembly are track slot 194, vertical slot 195 and ball bore 196. With the handle assembly installed, vertical slot 195 controls the lateral position of arm 186 and track slot 194 provides a contained platform for the reciprocating action of fulcrum 187.

Figure 17:
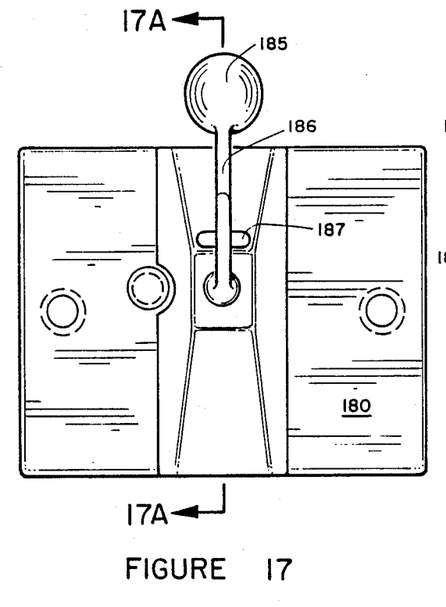
FIG. 17 is a front elevation view of the dispensing assembly.
Figure 17A:
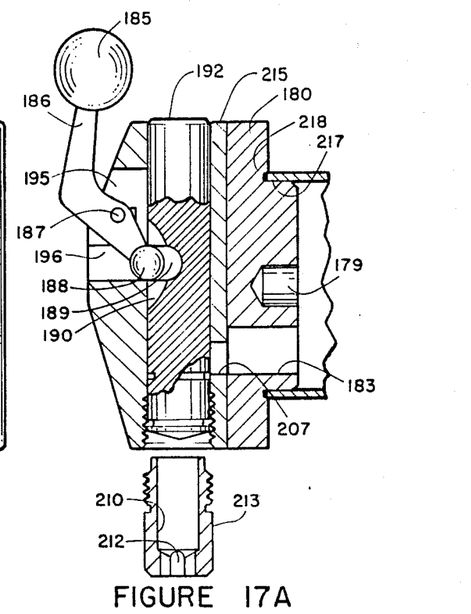
FIG. 17A is a cross sectional view taken along lines 17A—17A of FIG. 17.
Figure 17B:
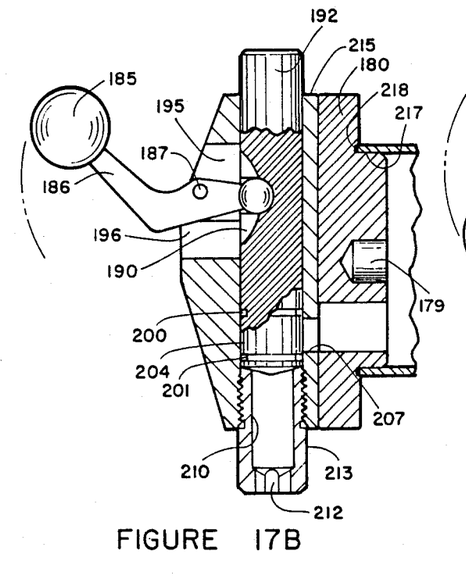
FIG. 17B and FIG. 17C are cross sectional views similar to that illustrated in FIG. 17A but with the handle depressed to different positions.
Figure 17C:
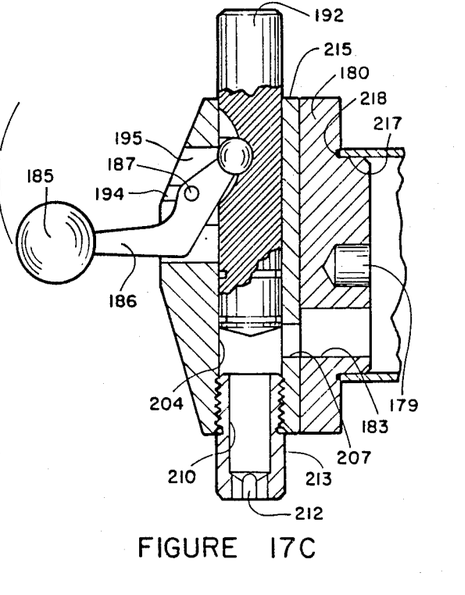

In FIG. 17B, the O-ring seals 200 and 201 of piston 192 interface with piston bore 204 of spigot housing 215, to seal housing inlet 207. In that position, the valve is closed. Handle pressure at the ball joint forces piston 192 upward to the position illustrated in FIG. 17C. In that Figure, fluid mix is permitted to enter bore 204 through inlet 207 to exit bore 210 and orifice 212 of dispensing cup 213. Dispensing cup 213 also functions as a stop for piston 192. In FIG. 17B, spigot housing 215 is bonded to face plate 180, which caps dasher cylinder 94, which bears on shoulder 217, sealed by O-ring 218.

What is claimed is:

1. A refrigerated mixing and dispensing machine for preparation of frozen dairy products and iced mixed beverages comprising:
    a motor with a drive shaft that has a longitudinally extending axis;
    a mix tank for fluids that are to be processed into form of frozen food product;
    a dasher assembly having a front end and a rear end;
    a pump for transferring a fluid from said mix tank to said dasher assembly, said pump having a top end, a front end and a rear end;
    means connecting the drive shaft of said motor to said pump;
    a dispensing assembly connected to said dasher assembly, said dispensing assembly having a solid spigot housing having a top wall, a bottom wall, a front wall and a rear wall, a piston bore extending from said top wall to said bottom wall, a vertically oriented elongated piston reciprocally mounted in said bore, said piston having a front wall having a lineal slot formed therein at a predetermined location, a spherical recess formed in said lineal slot, a handle having an elbow shape has a drive ball formed on its lower end that travels in said spherical recess formed in the front of said piston to cause said piston to reciprocate along a vertical path, a ball bore and a vertical slot are formed in the front wall of said spigot housing that communicate with said piston bore, a transversely extending fulcrum pin on said handle and means for allowing it to travel in a horizontal path in said spigot housing; and
    means for cooling a fluid as it is processed through said dasher assembly.

2. A refrigerated mixing and dispensing machine for preparation of frozen dairy products and iced mixed beverages comprising:
    a motor with a drive shaft that has a longitudinally extending axis;
    a mix tank for fluids that are to be processed into a form of frozen food product;
    a dasher assembly having a front end and a rear end;
    a pump for transferring a fluid from said mix tank to said dasher assembly, said pump having a solid block housing having a top end, a front end and a rear end, said pump having a cavity formed in its front end and a rotor is removably mounted therein on the drive shaft of the pump, said drive shaft passing through a bore hole extending from the rear end of said pump housing to said cavity in said front wall, a fluid inlet passageway having a predetermined width extends from said cavity to the top end of said pump and the top end of said passage way is connected to the interior of said mix tank, a vertically oriented plunger is vertically reciprocally mounted in said fluid inlet passageway, said plunger having a top end, said plunger having a bottom end that normally contacts said rotor and which functions to provide a moving seal and to divide the cavity into a vacuum chamber to the rear of said plunger and a pressure chamber to the front of said plunger, said plunger having a horizontal thickness less than the width of said fluid inlet passageway so that fluid may freely flow therepast, the bottom end of said plunger has a pressure relief surface extending outwardly from said pump rotor into said pressure chamber that permits said plunger to act in the manner of a piston to control pressure at the output side of said plunger, thus when fluid pressure bearing against said pressure relief surface exceeds the gravity of the plunger, said plunger is forced upwardly, in which case, it functions as a bypass valve to regulate dasher assembly pressure.

3. A refrigerated mixing and dispensing machine as recited in claim 2 further comprising a vertically oriented stem having a top end and an bottom end, said bottom end being secured to the top end of said plunger, the top end of said stem being connected to means for creating pressure by said plunger against said rotor greater than the gravity affect of said stem and plunger.

4. A refrigerated mixing and dispensing machine as recited in claim 2 further comprising means to regulate the mixture of air and fluid entering said pump.

5. A refrigerated mixing and dispensing machine as recited in claim 4 wherein said means to regulate the mixture of air and fluid entering said pump comprises a tube having a top end and a bottom end, the bottom end of said tube being connected to said passage way of said pump and its top end extending above the top surface of the fluid in said mix tank, a liquid inlet orifice is formed in said tube just above the bottom wall of said mix tank, an elongated sleeve having a top end and a bottom end is telescopically mounted in said tube, an air intake orifice is formed in said sleeve adjacent its top end above the level of fluid in said mix tank.

6. A refrigerated mixing and dispensing machine as recited in claim 5 further comprising means for rotating said sleeve with respect to said tube thereby varying the mixture of air and fluid and also structure for locking their positions with respect to each other.

7. A refrigerated mixing and dispensing machine for preparation of frozen dairy products and iced mixed beverages comprising:
 a motor with a drive shaft that has a longitudinally extending axis;
 a mix tank for fluids that are to be processed into a form of frozen food products;
 a dasher assembly having a front end and a rear end, said dasher assembly having an elongated cylindrical housing having a front end, a rear end and interior walls, mounted in its interior is a scraper blade having torque activated means for pressure loading said scraper blade against the interior walls of said dasher cylinder, and as a subsequent function, rotate the dasher assembly, said torque activated means comprising a rotatable drive pawl in mechanical linkage with a rotatable scraping blade pawl, each contained in respective bores of a dasher assembly, said drive pawl and scraping blade pawl being provided with drive cavities to rotatably transmit a ratio of leverage pressure from said drive pawl to said blade pawl, said leverage pressure loads the scraper blade against the cylinder wall in direct proportion to mix viscosity as sensed through mix resistance bearing against all components of said dasher;
 a pump for transferring a fluid from said mix tank to said dasher assembly, said pump having a top end, a front end and a rear end;
 means connecting the drive shaft of said motor to said pump;
 a dispensing assembly connected to said dasher assembly; and
 means for cooling a fluid as it is processed through said dasher assembly.

8. A refrigerated mixing and dispensing machine for preparation of frozen dairy products and ice mixed beverages comprising:
 a motor with a drive shaft that has a longitudinally extending axis;
 a mix tank for fluids that are to be processed into a form of frozen food product;
 a dasher assembly having a front end and a rear end, said dasher assembly having an elongated cylindrical housing having a front end and a rear end and mounted in its interior is a scraper blade having means for torque activating said blade so that it is rotatable therein;
 a pump for transferring a fluid from said mix tank to said dasher assembly, said pump having a top end, a front end and a rear end;
 means connecting the drive shaft to said motor to said pump;
 a dispensing assembly connected to said dasher assembly;
 means for cooling a fluid as it is processed through said dasher assembly; and
 said pump having an annular recess in its front wall that mates with the rear end of said cylindrical housing to thereby support said dasher assembly.

9. A refrigerated mixing and dispensing machine for preparation of frozen dairy products and ice mixed beverages comprising:
 a motor with a drive shaft that has a longitudinally extending axis;
 a mix tank for fluids that are to be processed into a form of frozen food product;
 a dasher assembly having a front end and an rear end, said dasher assembly having an elongated cylindrical housing having a front end and a rear end and mounted in its interior is a scraper blade having means for torque activating said blade so that it is rotatable therein;
 a pump for transferring a fluid from said mix tank to said dasher assembly, said pump having a top end, a front end and rear end;
 means connecting the drive shaft of said motor to said pump;
 a dispensing assembly connected to said dasher assembly;
 means for cooling a fluid as it is processed through said dasher assembly; and
 said dasher assembly having a support intake disc rotatably mounted in its rear end and a dasher discharge disc rotatably mounted in its front end.

* * * * *